United States Patent
Freytag et al.

(10) Patent No.: US 7,413,201 B2
(45) Date of Patent: Aug. 19, 2008

(54) STEERING SYSTEMS

(75) Inventors: Erich Freytag, Sachsenried (DE); Bernd Glaser, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 123 days.

(21) Appl. No.: 11/438,681

(22) Filed: May 22, 2006

(65) Prior Publication Data

US 2007/0001416 A1    Jan. 4, 2007

(30) Foreign Application Priority Data

May 28, 2005 (GB) ................................ 0510990.5

(51) Int. Cl.
*B60D 7/18* (2006.01)
(52) U.S. Cl. ..................... 280/93.512; 403/27; 403/76; 403/122
(58) Field of Classification Search ............ 280/93.512, 280/93.5, 96.502, 93.51; 403/1, 27, 66, 76, 403/111, 119, 122, 150, 152, 157
See application file for complete search history.

(56) References Cited

U.S. PATENT DOCUMENTS

| | | | | |
|---|---|---|---|---|
| 3,438,646 | A | * | 4/1969 | Hannapel .................... 280/93.5 |
| 3,549,166 | A | * | 12/1970 | Moore et al. ........... 280/93.512 |
| 4,775,026 | A | | 10/1988 | Sollbach et al. |
| 5,538,274 | A | * | 7/1996 | Schmitz et al. ....... 280/124.142 |
| 6,494,471 | B2 | * | 12/2002 | Lukac ....................... 280/93.5 |
| 7,296,810 | B2 | * | 11/2007 | Thannikary et al. ........ 280/93.5 |
| 2002/0089142 | A1 | * | 7/2002 | Lukac ................... 280/93.512 |
| 2006/0022420 | A1 | * | 2/2006 | Pressler et al. ......... 280/93.512 |
| 2007/0001416 | A1 | * | 1/2007 | Freytag et al. ......... 280/93.512 |

FOREIGN PATENT DOCUMENTS

| | | |
|---|---|---|
| DE | 10110738 | 11/2002 |
| EP | 0042080 | 12/1981 |
| EP | 0873932 | 10/1998 |
| EP | 0888951 | 1/1999 |
| WO | WO 2005/021296 | 3/2005 |
| WO | WO 2005/045265 | 5/2005 |

OTHER PUBLICATIONS

UK Search Report for Application No. GB0510990.5 dated Sep. 16, 2005.

* cited by examiner

*Primary Examiner*—Christopher Bottorff
*Assistant Examiner*—Karen Jane J. Amores
(74) *Attorney, Agent, or Firm*—Ryan A. Schneider, Esq.; Troutman Sanders LLP

(57) ABSTRACT

The invention discloses a utility vehicle, in particular an agricultural tractor, with a steering system having single-wheel-suspended steering wheels, which are mounted on a respective wheel carrier (11). Each wheel carrier (11) may be swivelled about the axis of at least one rigidly connected bolt (18) and is connected via a ball-and-socket joint (9) on the at least one bolt, to a transverse steering element (1) that is articulated to the vehicle body.

Associated with the ball-and-socket joint (9) is a steering angle sensor (22) comprising a rotatable input member (23), which is located at least approximately in the extension of the axis of the swivel bolt (18). The rotatable input member (23) is connected to the bolt via an entrainment element (25) that transmits the swivel motion of the bolt in an angularly precise manner to detect the current swivel position of the wheel carrier (11).

7 Claims, 4 Drawing Sheets

STEERING SYSTEMS

This Application is based on, and claims priority to, UK Application No. GB0510990.5, filed May 28, 2005.

BACKGROUND OF THE INVENTION

The invention relates to a utility vehicle, in particular an agricultural tractor, with a steering system having single-wheel-suspended steering wheels, which are mounted on a respective wheel carrier, wherein each wheel carrier may be swivelled about the axis of at least one rigidly connected bolt which is connected via a ball-and-socket joint, to a transverse suspension element that is articulated to the vehicle body.

U.S. Pat. No. 5,538,274 describes a utility vehicle having a single-wheel suspension system for the steering wheels. The steering wheels are each mounted on a wheel carrier, which is connected via two ball-and-socket joints to an upper and a lower transverse suspension element. The transverse suspension elements are pivotally mounted on the vehicle frame and guide the wheel carrier during vertical movement of the suspension elements relative to the body vehicle. The ball-and-socket joints allow not only the suspension movement, but also the pivoting of the wheel carrier about an axle connecting the ball-and-socket joints, for the purpose of steering the vehicle. A ball-and-socket joint consists of a ball, which is rigidly connected to the wheel carrier via a bolt, and a ball shell that encompasses the ball and is an integrated component of the associated transverse suspension element. During pivoting of the wheel carrier, the ball is rotated within the ball shell in the same direction as the wheel carrier. During the suspension movement of the vehicle, on the other hand, the direction of motion of the ball extends perpendicularly thereto. These different directions of motion of the ball make precise detection of the steering angle, in proximity to the wheel, appear impossible. As precise detection of the steering angle is imperative for the automatic guiding of vehicles, for example by means of GPSs (Global Positioning Systems), the steering angle has in the past been detected indirectly on components of the steering device that are remote from the wheel. Thus, in the case of vehicles with hydraulic steering systems, in particular, the steering angle was determined by detecting the position of the piston in the steering cylinder of the steering device. However, as there is no fixed relation between the position of the piston and the position of the wheel carrier in steering devices of this type, the current steering angle has to be determined on the basis of the measured piston position using additional calculations. This entails considerable expenditure on hardware and software for the electronic equipment of the vehicle, particularly if a large number of vehicle types are equipped with different steering devices.

Although EP 0 888 951 B1 has disclosed a device for utility vehicles that allows the steering lock angle to be determined in proximity to the wheel, these vehicles are equipped not with a single-wheel suspension system for the steering wheels, but rather with a rigid axle. The wheel carriers of this rigid axle are connected to the axle body via simple axle bolts that form rotary joints and pivot with the wheel carriers. As the rotary joint is thus fixed to the axle body, the rotary joint merely absorbs swivel motions of the axle bolt that derive from a steering process and are detected by means of a suitable steering angle sensor that is attached to the axle body.

The object of the invention is to make in a simple manner a utility vehicle of the type mentioned at the outset suitable for automatic steering.

BRIEF SUMMARY OF THE INVENTION

This object is achieved in that associated with the ball-and-socket joint is a steering angle sensor comprising a rotatable input member, which is located at least approximately in the extension of the axis of the bolt and is connected to the bolt via an entrainment element that transmits the swivel motion of said bolt in an angularly precise manner to detect the current swivel position of the wheel carrier.

This allows the swivel position of the wheel carrier over the entire swivel path to be transmitted in a precise manner to the steering angle sensor.

Adjustment of the sensor signals, such as would have to be undertaken in the case of known devices for detecting the steering angle, is therefore not required. Known devices of this type are based on determining the position of components of the steering linkage, for example the piston in the steering cylinder, and, on account of the complex mechanics of the steering linkage, do not allow any direct conclusions regarding the position that is actually assumed by the wheel carrier to be drawn from the measured value of the sensor. Although electronic circuits may be used for the adjustment of sensor signals of this type, they have to be separately calibrated for vehicles having non-identical steering devices.

An embodiment of the invention described in claim 2 has the advantage that the motion of the steering angle sensor relative to the ball during vertical movement of the vehicle body and during pivoting of the wheel carrier is very slight, and the entrainment element is thus subjected to little stress during the transmission of the swivel motion of the wheel carrier. In the case of a compact design, the entrainment element is subjected to still less stress and the transmission of the swivel motion of the wheel carrier to the steering angle sensor is even more precise if the entrainment element according to claim 3 effectively issues from the centre point of the ball-and-socket joint.

A technically simple refinement of the invention that is distinguished by low wear and a long service life of the entrainment element, with high transmission precision, is provided by the features of claims 1, 4 and 5.

A further advantageous possibility for transmitting the swivel motion of the wheel carrier to the steering angle sensor consists, according to claim 6, in the fact that the entrainment element is a pliable shaft.

Arranging the ball according to claim 7 in an end region of the bolt allows the provision of a compact ball-and-socket joint in which the steering angle sensor may be accommodated in very close proximity to the ball and therefore performs, when the vehicle is being driven, only very slight movements relative to the ball, which are to be transmitted by the entrainment element.

BRIEF DESCRIPTION OF THE DRAWINGS

An embodiment of the invention will be explained below in greater detail with reference to the drawings, in which.

DETAILED DESCRIPTION OF THE INVENTION

Figure 1:
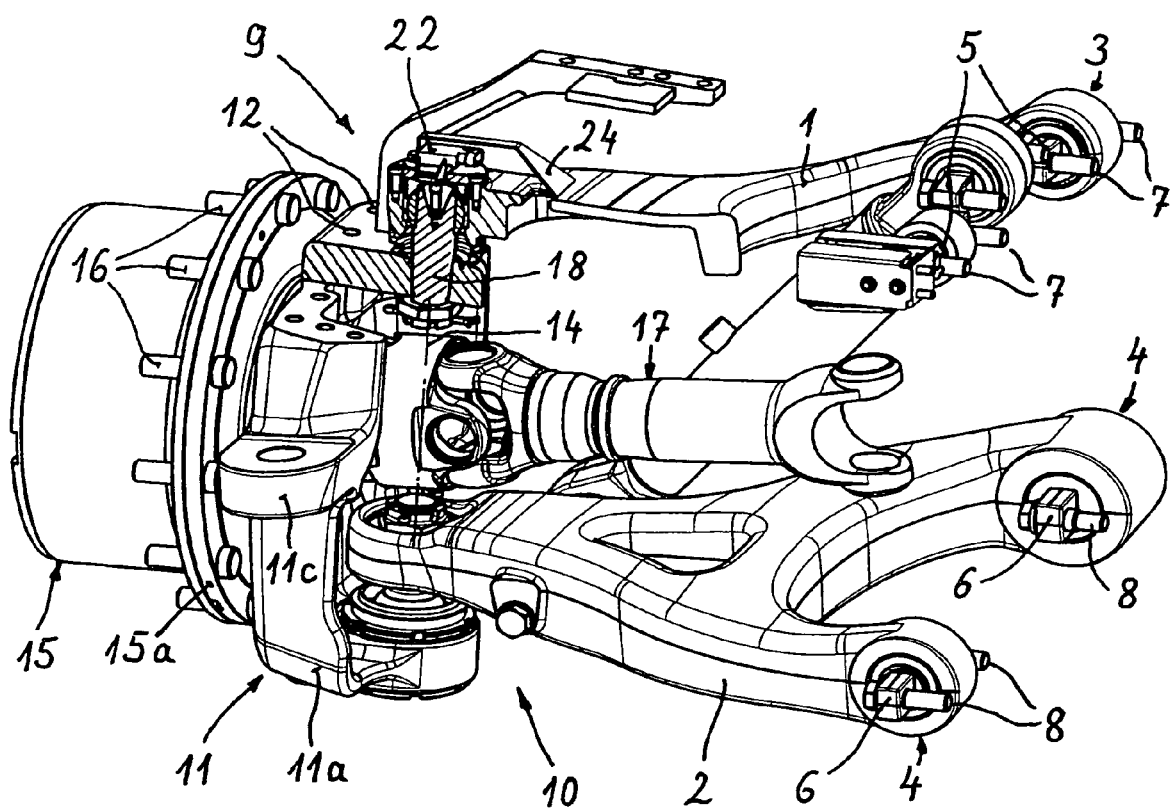
FIG. 1 shows a wheel suspension for the steering wheel of the right-hand vehicle side of an agricultural tractor, with a wheel carrier swivelled in the straight-ahead position and a ball-and-socket joint in section.
Figure 2:
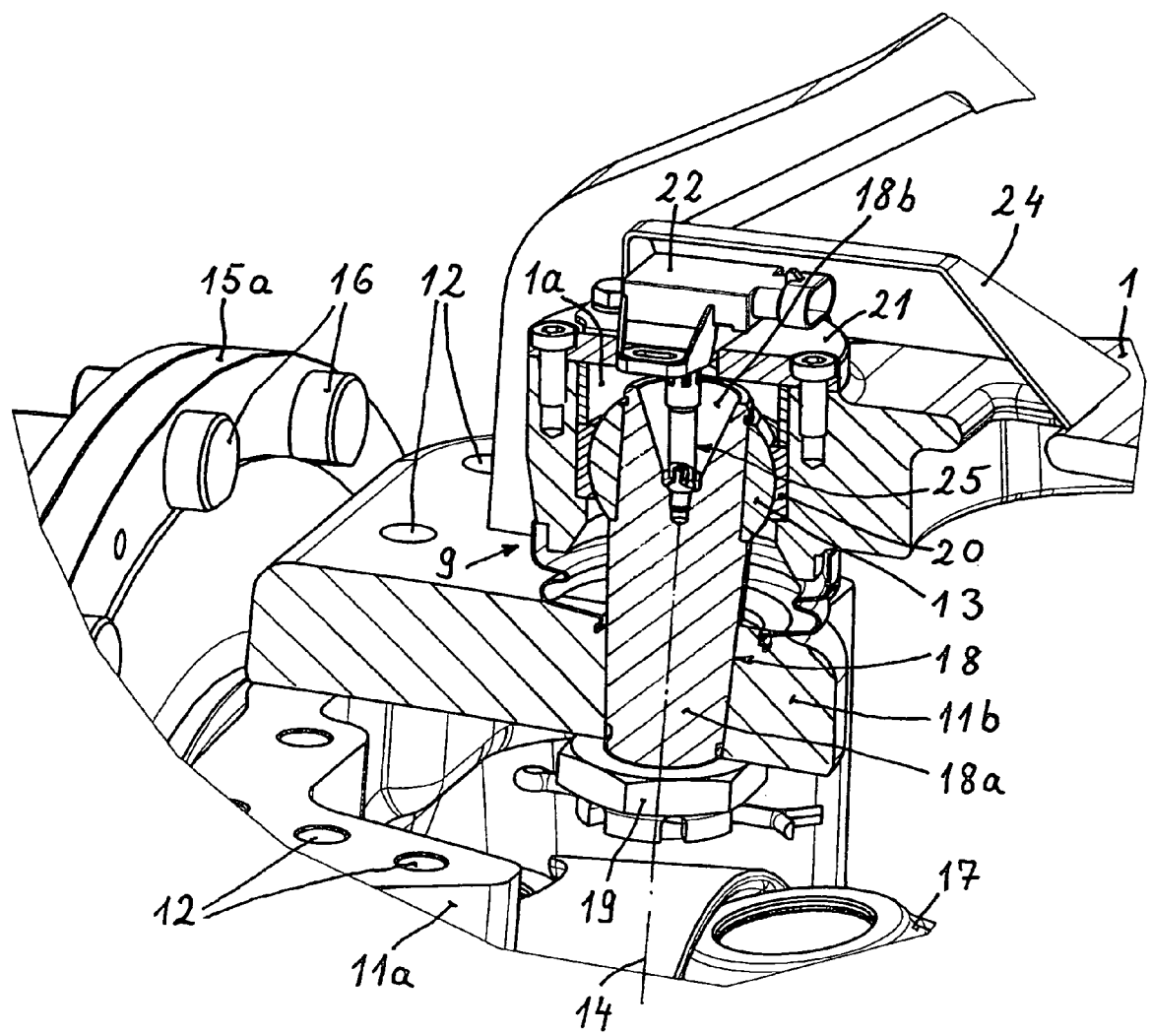
FIG. 2 is an enlarged detail of the suspension according to FIG. 1.
Figure 3:
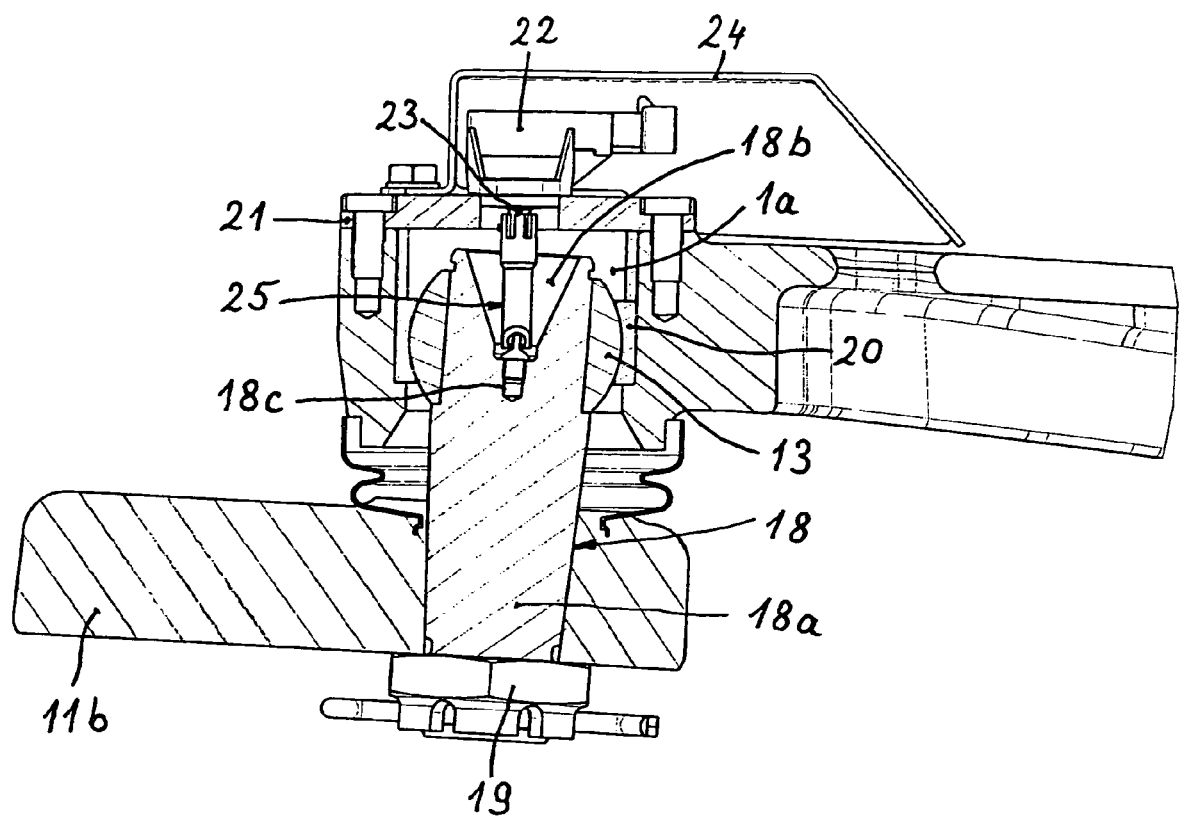
FIG. 3 is a sectional view of the ball-and-socket joint according to FIG. 2 and the connection of the wheel carrier and a steering angle sensor by means of an entrainment element.

The wheel suspension shown in FIG. 1 for the steering wheel of the right-hand vehicle side comprises an upper transverse suspension element 1 and a lower transverse suspension element 2. Both transverse suspension elements 1, 2 are pivotally mounted via joints 3, 4 on the vehicle bodywork (not shown). The axles 5, 6 of the joints 3, 4 extend substantially horizontally in the vehicle longitudinal direction and are fastened to the vehicle bodywork by means of screws 7, 8. The upper transverse suspension element 1 is connected to a wheel carrier 11 via an upper ball-and-socket joint 9 accommodated in its free end region. Said wheel carrier has a lower principal part 11a, in the lower region of which a ball-and-socket joint 10 required for the attachment of the lower transverse suspension element 2 is mounted. An upper covering plate 11b, which is screwed to the principal part 11a at 12 is connected to the ball 13 of the ball-and-socket joint 9, which is associated with the upper transverse steering element 1. The wheel carrier 11 may be pivoted about an axis 14 connecting the centre points of the two ball-and-socket joints 9, 10 and also supports a wheel hub 15 that is provided with a flange 15a and to which a steerable wheel (not shown) is fastened by means of screws 16. The wheel hub 15 may be driven by means of a reduction gear that is accommodated in its interior, for which purpose the input shaft of said wheel hub is connected to the vehicle transmission via an articulated drive shaft 17. The wheel carrier 11 is also provided with an arm 11c, on which a steering linkage (not shown) of the hydrostatic steering device of the vehicle acts in order to allow the wheel carrier 11 to be swivelled about the axis 14 into the desired direction of travel. FIG. 1 shows the wheel carrier 11 swivelled into the position for straight-ahead travel, in which it is aligned in the vehicle longitudinal direction. FIGS. 2 and 3 show, on a larger scale than FIG. 1, the ball-and-socket joint 9 connecting the upper transverse steering element 1 to the wheel carrier 11. The ball-and-socket joint 10 connecting the lower transverse steering element 2 to the wheel carrier 11 is constructed in a similar manner. The ball-and-socket joint 9 is produced by means of a bolt 18, the conical bolt part 18a of which is anchored in the covering plate 11b of the wheel carrier 11 by means of a screw nut 19 and the free end region of which protrudes from the wheel carrier 11. The axis of the bolt 18 coincides with the axis 14 connecting the ball-and-socket joints 9, 10. In its free end region, the bolt 18 holds the ball 13, which is fixed in the axial direction by means of a securing ring. The ball 13 is configured as an inner ring which is encompassed by an outer ring 20, which is fixed in a borehole 1a in the upper transverse suspension element 1.

In order to determine the swivel position of the wheel carrier 11 and thus to detect, in proximity to the wheel, the steering wheel lock, a steering wheel sensor 22 of known design is fastened to a plate 21 covering the borehole 1a. The steering angle sensor 22 comprises a rotatable input member 23, which is located on the extension of the axis 14 and protrudes through an aperture in the plate 21 into the bore 1a in the upper transverse steering element 1. In order to protect it from harsh weather and contamination, the steering angle sensor 22 is provided with a cover 24.

At the free end of bolt 18, a conical cavity 18b is provided. This cavity 18b extends to behind the centre point C of the ball-and-socket joint 9, where it forms a suitable fastening point for an entrainment element 25. The purpose of the entrainment element 25 is to transmit the rotary motion, corresponding to the swivel path of the wheel carrier 11, of the bolt 18 to the input member 23 of the steering angle sensor 22 in an angularly precise manner. In the embodiment described, the cavity 18b ends in a tapped hole 18c, into which a correspondingly configured end part 25a of the entrainment element 25, which is configured as a hinge shaft, is screwed. However, not only hinge shafts, but rather any components that are capable of transmitting rotary motions in an angularly precise manner, may be used as the entrainment element 25. A pliable shaft, for example, which may be connected in a suitable manner to the bolt 18 and to the input member 23 of the steering angle sensor 22, may thus be used instead of a hinge shaft.

As the upper transverse suspension element 1, which holds the steering angle sensor 22, performs a movement relative to the bolt 18 during compression and release of the vehicle body, the entrainment element 25 has a cardan joint 25b, which is arranged precisely at the centre point C of the ball-and-socket joint 9. The shaft 25c, which is located above the cardan joint 25b, may thus be moved freely within the cavity even if the wheel carrier is swivelled during compression or release of the vehicle body in order to change the direction of travel.

Figure 4:
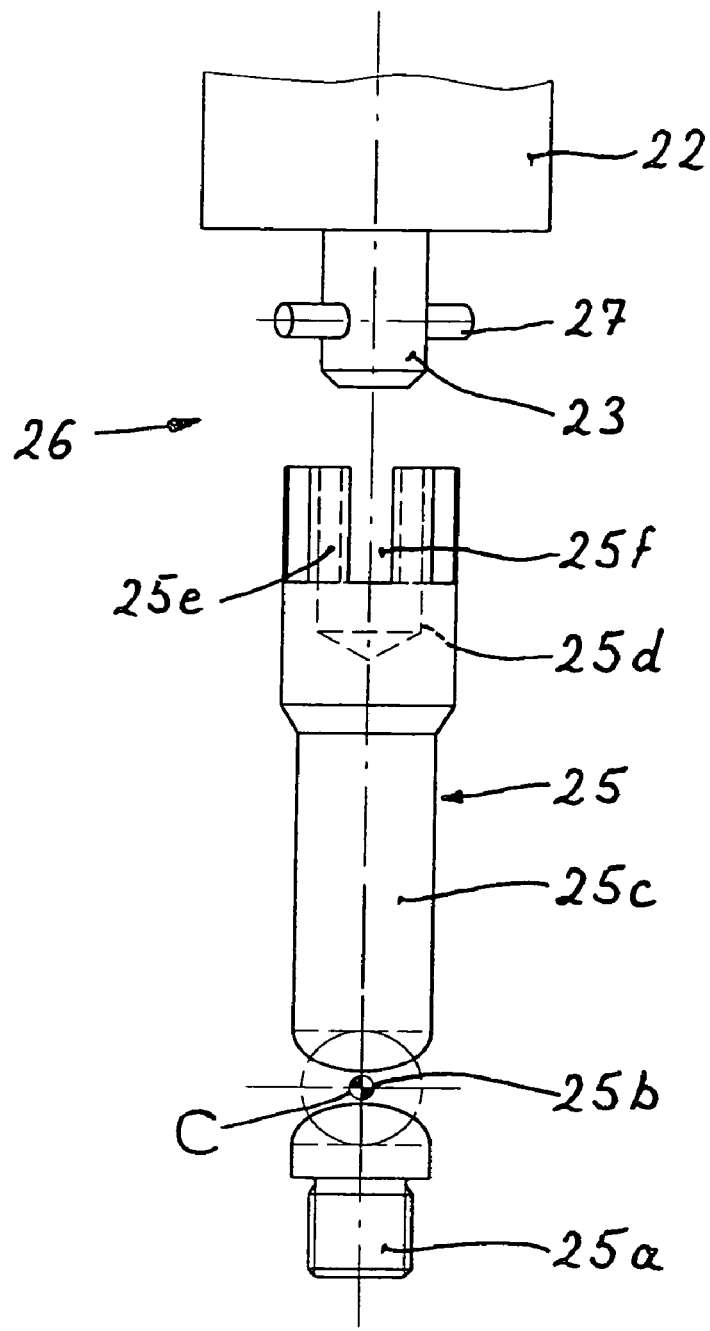
FIG. 4 is an exploded view of the coupling point between the entrainment element and the input element of the steering angle sensor.
Figure 5:
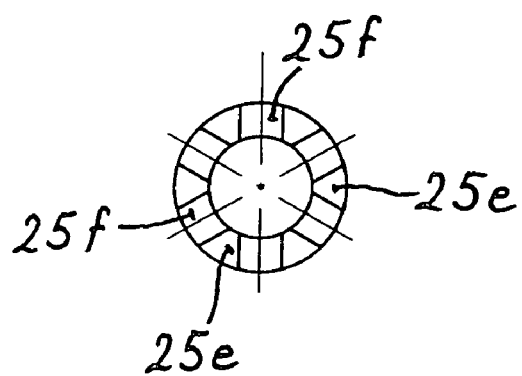
FIG. 5 is a plan view of the entrainment element according to FIG. 4.

The attachment of the entrainment element 25 to the input member 23 of the steering angle sensor 22 may be seen from FIGS. 3 and 4 and takes place by means of a coupling 26, the part of which that is in proximity to the sensor being formed by the input member 23 itself. For this purpose, the input member 23 is provided with an entrainment pin 27, which extends transversely to its axis and protrudes on both sides. According to FIGS. 4 and 5, the free end of the shaft 25c, which is provided with an axial reception hole 25d into which the input member 23 is inserted, forms the part of the coupling 26 that is remote from the sensor. A plurality of opposing slots 25f, with which the entrainment pin 27 of the input member 23 engages, are located in the wall 25e surrounding the reception hole 25d. The slots 25f are sufficiently long to accommodate variations in distance between the centre C of the ball-and-socket joint 9 and the input member 23 that occur at this location during release or compression of the vehicle body.

The invention claimed is:

1. A utility vehicle with a steering system having single-wheel-suspended steering wheels, which are mounted on a respective wheel carrier (11), wherein each wheel carrier may be swivelled about the axis of at least one rigidly connected bolt (18) and is connected via a ball-and-socket joint (9), on the bolt, to a transverse suspension element (1) that is articulated to the vehicle body, wherein associated with the ball-and-socket joint (9) is a steering angle sensor (22) comprising a rotatable input member (23), which is located at least approximately in the extension of the axis of the swivel bolt (18), the rotatable input member being connected to the bolt via an entrainment element (25) that transmits the swivel motion of said bolt in an angularly precise manner to detect the current swivel position of the wheel carrier (11), wherein the entrainment element (25) is a hinged shaft, which in the end region in proximity to the wheel carrier comprises a cardan joint (25b) and in the end region in proximity to the sensor is connected to the input member (23) via an articulated coupling (26) that compensates variations in distance between the centre point (C) of the ball-and-socket joint (9) and the steering angle sensor (22).

2. A utility vehicle according to claim 1, in which the steering angle sensor (22) is fastened to the transverse suspension element (1) and its input member (23), is located on the extension of the axis of the bolt (18).

3. A utility vehicle according to claim 1 in which a cavity (18*b*), which encloses at least the centre point (C) of the ball-and-socket joint (9) and in which the entrainment element (25) is at least partially accommodated, is formed in said ball-and-socket joint, and in that the entrainment element (25) is resilient in the region of the centre point (C) of the ball-and-socket joint (9).

4. A utility vehicle according to claim 1 in which the cardan joint (25*b*) is arranged at the centre point (C) of the ball-and-socket joint (9).

5. A utility vehicle according to claim 1 in which the part of the coupling (26) that is in proximity to the sensor consists of the input member (23) of the steering angle sensor (22), into which an entrainment pin (27) extending transversely to the longitudinal axis of said input member is inserted, and in that the part of the entertainment element adjacent to the sensor is provided with a hole (25*d*) which receives the input member (23) and with at least two diametrically opposed slots (25*f*) extending in the axial direction with which the entrainment pin (27) engages.

6. A utility vehicle according to claim 1 in which the entrainment element is a pliable shaft.

7. A utility vehicle according to claim 1 in which the ball (13) of the ball-and-socket joint (9) is arranged in an end region of the bolt (18).

* * * * *